United States Patent
Desiderato

(10) Patent No.: US 8,847,502 B2
(45) Date of Patent: Sep. 30, 2014

(54) POWER FACTOR CORRECTION METHOD AND DEVICE FOR DISCHARGE LAMPS, FOR EXAMPLE HIGH PRESSURE SODIUM LAMPS

(75) Inventor: Luigi Desiderato, Legnano (IT)

(73) Assignees: Luigi Desiderato (IT); Marcello Ragnolini (IT); Giuseppe Daniele Bagnarelli (IT)

( * ) Notice: Subject to any disclaimer, the term of this patent is extended or adjusted under 35 U.S.C. 154(b) by 165 days.

(21) Appl. No.: 13/381,826

(22) PCT Filed: Jul. 2, 2010

(86) PCT No.: PCT/EP2010/004013
§ 371 (c)(1),
(2), (4) Date: Mar. 26, 2012

(87) PCT Pub. No.: WO2011/000574
PCT Pub. Date: Jan. 6, 2011

(65) Prior Publication Data
US 2012/0176053 A1 Jul. 12, 2012

(30) Foreign Application Priority Data

Jul. 2, 2009 (EP) .................... 09425259

(51) Int. Cl.
H05B 37/02 (2006.01)
H05B 41/292 (2006.01)
H05B 41/288 (2006.01)
H05B 41/392 (2006.01)
H05B 41/28 (2006.01)

(52) U.S. Cl.
CPC ........ *H05B 41/2887* (2013.01); *H05B 41/2928* (2013.01); *H05B 41/3925* (2013.01); *Y02B 20/202* (2013.01); *H05B 41/28* (2013.01)
USPC ........ 315/194; 315/200 R; 315/129; 315/203; 315/308

(58) Field of Classification Search
USPC ............. 315/129, 194–199, 200 R, 203, 204, 315/208, 246, 291, 307, 308, 326, 339, 349
See application file for complete search history.

(56) References Cited

U.S. PATENT DOCUMENTS

| 6,072,283 | A | 6/2000 | Hedrei et al. |
| 6,259,215 | B1 * | 7/2001 | Roman ......................... 315/307 |
| 6,914,395 | B2 * | 7/2005 | Yamauchi et al. ............ 315/308 |

(Continued)

FOREIGN PATENT DOCUMENTS

EP 0386990 A2 9/1990

OTHER PUBLICATIONS

International Preliminary Report on Patentability issued in connection with PCT/EP2010/004013.

*Primary Examiner* — Vibol Tan
(74) *Attorney, Agent, or Firm* — Akerman LLP

(57) ABSTRACT

The present invention relates to a method for driving and to an associated command and control device for discharge lamps (2), for example high pressure sodium lamps (2), supplied by an alternating current electrical supply network. Both the method and the device provide the use of an electronic microprocessor (7) receiving on the input side data relating to the current drawn by the lamp (7) and connected on the output side to a power switch (6) for high frequency switching of the alternating current supply to the lamp.

6 Claims, 7 Drawing Sheets

(56) References Cited

U.S. PATENT DOCUMENTS

| | | | |
|---|---|---|---|
| 8,390,211 B2* | 3/2013 | Green et al. | 315/291 |
| 2002/0070684 A1 | 6/2002 | Bruning | |
| 2005/0270813 A1 | 12/2005 | Zhang et al. | |
| 2008/0180037 A1* | 7/2008 | Srimuang | 315/246 |
| 2009/0200954 A1* | 8/2009 | Li et al. | 315/246 |
| 2012/0313530 A1* | 12/2012 | Hollander | 315/129 |

* cited by examiner

FIG.1 – PRIOR ART

POWER FACTOR CORRECTION METHOD AND DEVICE FOR DISCHARGE LAMPS, FOR EXAMPLE HIGH PRESSURE SODIUM LAMPS

This application is a national phase of PCT/EP2010/004013, filed Jul. 2, 2010, and claims priority to EP 09425259.0, filed Jul. 2, 2009, the entire contents of both of which are hereby incorporated by reference.

FIELD OF THE INVENTION

The present invention relates more generally to the field of public lighting installations which comprise a plurality of lamp posts, for example street lighting installations, and communication means for switching on, switching off and modulating them individually or in selective groups.

More particularly, the present invention relates to a method for driving discharge lamps, supplied by an alternate current electrical supply network, by supplying the minimum possible number of starting pulses (typically just one) in the switch-on phase and regulating their steady-state luminosity.

In still greater detail, the invention relates to a method for driving and an associated command and control device for discharge lamps, for example high pressure sodium lamps, such as may equip the lamp posts of public lighting installations, but may also be used in industrial or the municipal sector for lighting areas or car parks of a relatively extensive area.

BACKGROUND OF THE INVENTION

As is well known in this specific technical field, there has for some time been a requirement to make the management of public street lighting installations more efficient and more economical. Satisfying this requirement would make it possible to extend the technical solutions which might be adopted for this purpose to other fields of application, for example in the public and industrial context.

Still more in particular, there is currently urgent demand from many public authorities so that they can pursue major economies in the consumption of electrical energy used for street lighting or lighting public areas.

If the problems underlying the present invention are to be better understood, it is first of all necessary to explain some concepts and notions relating to gas discharge lamps, for example xenon discharge lamps or a high pressure sodium discharge lamps.

Studies carried out on xenon (Xe) discharge lamps, used in "climatic chambers", namely in chambers in which accelerated ageing conditions are simulated by reproducing all possible climatic conditions (generally humidity, acidity, temperature and pressure), have revealed interesting information relating to current flow modes in the lamp bulbs.

These bulbs are usually made from quartz and filled with various types of gas which are capable of supporting the flow of electric current once they have been brought to a particular state of excitation, known as ionisation, in the switch-on phase. In practice, the gas molecules, once electrically charged (preionisation phase), undergo a change in their electrical state, changing from an insulator to a conductor. In this latter state, they can thus permit the flow of electric current in exchange for strong light emission which usually arises due to a thermoelectric effect.

The current may thus be externally controlled by means of appropriate electrical driving circuits, with the aim of regulating steady-state light emission, in terms of both wavelength (spectrum) and intensity (lumens per $m^2$—i.e. lux—or W per $m^2$, depending on the reference variable stated in the regulations).

Further studies carried out by the Applicant have focused on other types of gas discharge lamps to investigate whether it might be possible to apply the knowledge and experience gained with xenon discharge lamps. Such further studies primarily related to high pressure sodium (HPS) lamps, which are today those which achieve the best ratio between luminosity (lumens emitted) and current consumed.

This type of lamp is also used very widely in public lighting installations thanks to the relative structural simplicity required by the installation. The currently most widespread lamps in fact comprise lamp posts with a lamp 2 connected in series to a current-limiting coil 3 and to an appropriate ignitor 4 which functions as a starter for the gas preionisation phase; this arrangement is connected to the general 230 V AC electrical supply network, as shown schematically in FIG. 1.

The lamps are generally rated at 150 W, although there are installations of up to 2000 W.

It should also be noted that HPS sodium lamps behave overall very differently from xenon lamps.

The emitted light spectrum is in fact very different, sodium lamps virtually completely lacking the ultraviolet component and instead comprising a very strong yellow/orange component which also characterises their appearance in the streets or squares where they are usually installed.

The studies carried out by the Applicant have made it possible to investigate some characteristics which are listed below, for each of which a brief general evaluation is provided:

- electrical efficiency achievable with conventional installations ranges from a minimum of 60% to a maximum of 79%. This calculation is made by straightforwardly applying the ratio "output power"/"input power". The variation in efficiency obtained is determined by the lamps from the various manufacturers, each of which suggests current-limiting coils of a value which varies from manufacturer to manufacturer;
- the power factor of the installation is quite low (0.53-0.65) and in any event outside any existing regulations (>=0.85). If it were desired to use a power factor correction capacitor, the problem of still lower electrical efficiency would have to be addressed;
- the operating temperature of the coils allows for increases of even greater than 60° C. above ambient temperature;
- it has been found that there is always a small continuous component in the current passing through the lamp, both immediately after switch-on (i.e. when the gas is yet to achieve thermal equilibrium), and after some minutes of operation. This fact brings about an appreciable degradation in both electrical efficiency and the average life of the lamps: in the first case because there is a constant power loss due to heating which cannot be used for conversion into radiant energy, in the second case because there is a constant migration of material from the internal electrodes of the lamp resulting in premature consumption. It is also worthwhile noting that gas excitation always proceeds by means of a high intensity electric field and that this makes it possible to "detach" some atoms from the material constituting the lamp electrodes resulting their actually being eroded and, ultimately, physically consumed;
- it is never possible to switch the lamps back on without having allowed a cooling time which may in some cases extend to several minutes;

it is not possible to switch the lamps on if the supply voltage is less than 195 V AC; in contrast, it is possible to keep them switched on at voltages of as low as approx. 180 V AC;

if the supply voltage is raised to approx. 250 V AC, electrical efficiency drops fairly quickly and assumes an average value of 65%.

The technical problem underlying the present invention is that of devising a command and control device for discharge lamps, for example high pressure sodium lamps, which has structural and functional characteristics such as to permit only active power to be drawn from the electrical network; in this manner, the efficiency of said electrical distribution network would be maximised.

Another object of the invention is to conceive a command and control device for discharge lamps which has structural and functional characteristics such as to permit the lamp to be driven at high frequency by controlling and regulating the voltage and current drawn and cutting any continuous current component absolutely to zero with the aim of maximising the average life of said lamp.

A further object of the invention is to be able to regulate luminous flux at will, as a function of the state of ageing of the lamp, so specifically enabling programmable light emission.

Another object of the invention is to permit the lamp also to be switched on at voltages below those which are currently possible, eliminating the waiting time for immediately switching back on and so actually allowing it to be switched back on when hot (hot restart).

Finally, an object of the present invention is, not least, to maximise the electrical efficiency of the command and control device for discharge lamps, also minimising operating temperatures and structural dimensions, with an aim of above all reducing the quantity of electrical energy necessary for achieving the radiation specified in international regulations.

BRIEF DESCRIPTION OF THE INVENTION

The concept on which the present invention is based is that of providing that the lamp be driven at relatively high current and switching frequencies.

On the basis of this concept, the problem is solved by using a microprocessor capable, on the input side, of measuring the current drawn by the lamp and, on the output side, of driving one or more power switches for high frequency switching of the current in the lamp.

The problem underlying the invention has thus been solved by a method for driving a discharge lamp, which includes:
  providing an alternating current electric supply network connected to an electronic microprocessor;
  supplying at least one starting pulse to the lamp in the switch-on phase and regulating the luminosity of the lamp in the steady state, through said electronic microprocessor, which receives on the input side data regarding the current drawn by the lamp and is connected on the output side to a stage incorporating at least one power switch for high frequency switching of the alternate current supply to the lamp, characterised in that said electronic microprocessor effects control and regulation of the power taken from the electrical supply network by regulating the current drawn such that it follows a sinusoidal course in phase with a reference waveform adapted to the network voltage which is measured from time to time and by changing continuously the driving frequency through the lamp switch-on period.

The present invention also relates to a command and control device for a discharge lamp, for example a high pressure sodium lamp, supplied by an alternate current electrical supply network, of the type intended to supply a starting pulse to the lamp in the switch-on phase and to regulate the luminosity of the lamp in the steady state, said device comprising an electronic processor receiving on the input side data regarding the current drawn by the lamp and connected on the output side to a stage incorporating at least one power switch for high frequency switching of the alternating current supply to the lamp, characterised in that said electronic microprocessor effects control and regulation of the power taken from the electrical supply network via a PFC block by regulating the current drawn such that it follows a sinusoidal course in phase with a reference waveform adapted to the network voltage which is measured from time to time and by changing continuously the driving frequency through the lamp switch-on period.

Particular embodiments of the method and device according to the present invention are reflected by the dependent claims.

Advantageously, the switching frequency is variable in a range of between 20 kHz and 75 kHz.

It should be noted that, since the network supply has a sinusoidal course, control is effected by a closed loop with a loop gain which varies as a function of the course said network voltage.

Advantageously, furthermore, driving proceeds at variable frequency in such a manner as to make it extremely straightforward to implement the controller by means of a DSP (Digital Signal Processor) type microprocessor capable of controlling current supply to the lamp with automatic cutoff in the event of overcurrent or excessive difficulty in starting (lamp at end of life).

According to the invention, the command and control device adopts an input power factor correction (PFC) stage or block which, apart from ensuring only active power is drawn from the network, also makes it possible to make a stabilised voltage available with which to supply the subsequent stage.

Furthermore, the device of the present invention is capable of delivering the same power demanded by lamp entirely independently of the prevailing network voltage (and frequency); this makes it possible to install the device of the present invention in any location without having to worry about the characteristics of the local electrical supply network.

It should furthermore be noted that the lamp may be activated by means of a half-bridge stage, a single power transistor (single ended) stage or a full-bridge stage, but in any event always at high frequency and with resonance to cut switching losses absolutely to zero. Any continuous component in lamp current is completely eliminated with any one of these circuit topologies.

The features and advantages of the method and device according to the invention will become clear from the following description of an exemplary embodiment thereof, which is given purely by way of non-limiting example with reference to the appended drawings.

DETAILED DESCRIPTION

Figure 1:
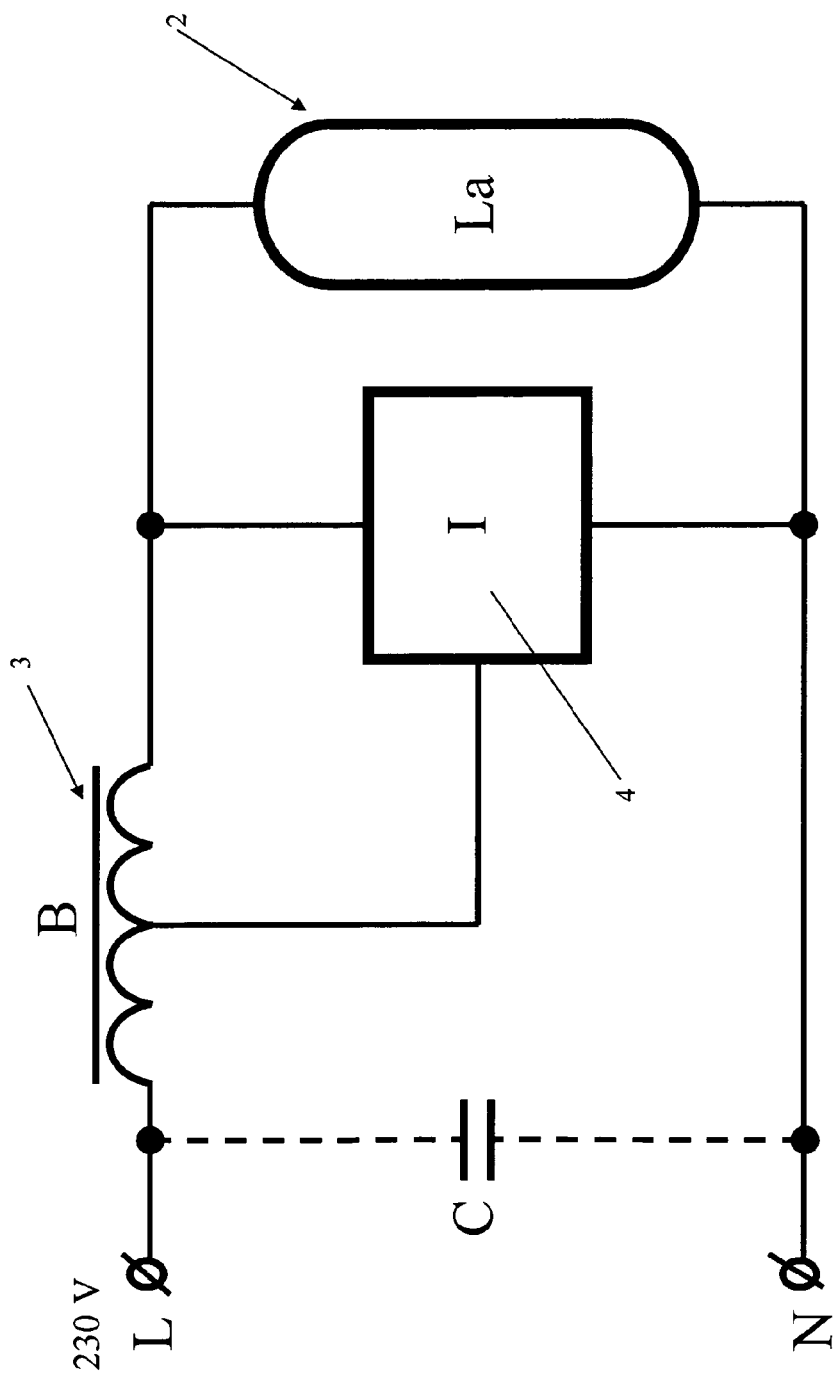
FIG. 1 shows a schematic view of a sodium lamp ignitor of known type.
Figure 2:
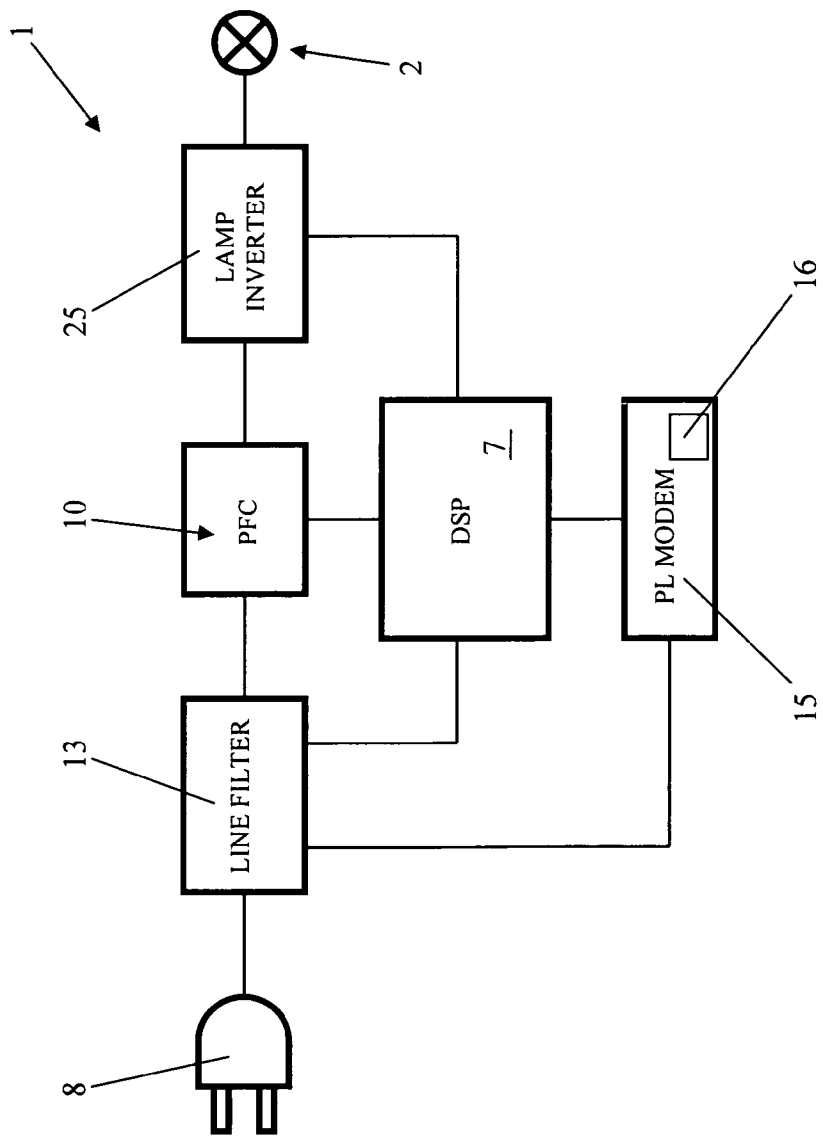
FIG. 2 shows a schematic block diagram of a device embodied according to the present invention for the command and control of discharge lamps.

With reference a these figures, 1 denotes overall and schematically a command and control device embodied according to the present invention for discharge lamps 2, for example high pressure sodium lamps, also known by the abbreviation HPS.

Such lamps 2 may be used in various fields of application, for example they may equip lamp posts 5 of public lighting installations or they may also be used as a fixed luminaire in the industrial or municipal sector for illuminating areas or car parks of a relatively extensive area.

The command and control device 1 for discharge lamps 2, for example sodium lamps HPS, is installed between the lamp and an alternating current electrical supply network 8 and supplies the minimum number of starting pulses (typically just one) to the lamp in the switch-on phase and regulates its steady-state luminosity.

Said device 1 comprises a microprocessor 7 which, on the input side, measures the current I drawn by the lamp and, on the output side, drives an inverter stage 25 incorporating one or more power switches 6 for high frequency switching of the current in the lamp.

The switch 6 may be, for example, a MOSFET power transistor.

With the invention, experimental trials carried out by the Applicant have made it possible to verify that, by reducing the current in the lamp, luminosity does not drop proportionally but instead clearly demonstrates the possibility of obtaining good levels of illumination even when lower currents are drawn.

This fact led to the solution of appropriate management of energy supply to the lamp in such a manner as to bring about a major increase in both its luminous efficiency and its energy efficiency understood as a substantial reduction in the quantity of electrical energy drawn.

Advantageously, precise control of the current which passes through the lamp, in particular a reduction in lamp current by a factor of 50%, has made it possible to achieve a reduction in emitted luminous flux of only 30%.

The command and control device 1 according to the invention will also be defined below by the term electronic ballast and essentially comprises the following functional blocks incorporated on a single circuit board:

a supply block 13 with line filter, with "Green Mode" functionality, connected to an electric power distribution network (90-265 V);

a DSP (Digital Signal Processing) control microprocessor 7, which comprises:

a. a portion for controlling and regulating the power taken from the electrical network;

b. a portion for controlling and regulating the current in the lamp 2;

c. a portion for controlling the starting phase of the lamp 2;

d. a portion dedicated to electrical measurements and data storage;

e. a portion for managing light profiles;

a power factor correction (PFC) block 10 closely associated with the processor 7;

an output stage 25 with one or more power switches 6 connected, on the input side, to one or more driving outputs of the microprocessor 7 and, on the output side, to the lamp 2 via an injector block 11;

a digital signal analysis modem 15 for power line communication (PLC) control 16 to permit connection with a remote management unit 14 in cooperation with the processor 7.

The characteristics of each component part of the electronic ballast 1 will now be examined in greater detail.

The supply block 13 is connected directly to the electrical supply network L, N and its architecture and functionality are such as to reduce stand-by consumption in accordance with European and American regulations, which are currently not mandatory, such as: "Code of Conduct" and "Energy Star". The block 13 supplies the processor 7, the modem 15 and the power correction block 10.

To this end, the supply 13 is constructed as a line filter and incorporates an LC controller known as a "Green Mode Supply", but also makes use of specific operational management determined by the operating status of the microprocessor 7 and the controller 16.

The execution status of the DSP microprocessor 7 and of the PLC control device 16 is subdivided into two modes:

active status stand-by status

Status is considered "active" when the electronic ballast 1:

is delivering current to the lamp 2 (with consequent light emission)

is communicating, i.e. exchanging commands or data with a remote management unit 14.

In all other cases, the status is deemed to be "stand-by".

The power consumption of the two microprocessors 7 and 16 is such that both must be maintained under low power draw conditions to reduce overall current consumption.

Advantageously, according to the invention, in order successfully to achieve the objectives while maintaining the low consumption specifications underlying the solution here proposed, a specific operating scheme in stand-by status has been devised to meet the requirements both of low consumption and of responsiveness of the device 1 on receiving a command.

By making use of the network frequency and a zero-crossing detector (ZCD) circuit, both of the processors 7, 16 are "woken up", i.e. put into active status with their associated nominal consumption, for each network period.

A command is sent from the remote management unit 14 which forces the device into one of the following states:

if no remote command is sent: the processors 7, 16 are immediately put into hibernation, so cutting consumption. The duration of processing is reduced to a few microseconds (µs) such that the energy required to keep the processors active is minimal and average consumption over the entire network period remains below the limits specified in the regulations;

if a remote command is received by the device 1, said command is immediately carried out and the associated response is transmitted to the remote management unit 14 by means of the modem 15 with the PLC device 16;

if the command received is a lamp switch-on command, stand-by mode is definitively abandoned until a subsequent lamp switch-off command is received.

a) Control and Regulation of the Power taken from the Electrical Network.

The DSP microprocessor 7 is a hardware component capable of carrying out the following measurements by means of the previously listed control portions:

1) measurement of input network voltage
2) measurement of the high frequency component of the input current
3) measurement of input current
4) measurement of intermediate voltage (between the two power stages)
5) measurement of lamp current
6) measurement of luminous emission of the lamp
7) measurement of internal temperature in the device It is thus capable of implementing seven measurements (via an analogue/digital converter, ADC) and six control loops (one further of these will be used just to simplify control as an intermediate calculation and so as not to constitute a problem associated with ADC performance). In order to achieve the deepest modulation (which obviously has an impact on the precision of each individual control loop), the acquisition and calculation frequency must be at least ten times faster than the current drawn from the network: is has proved appropriate to select a sampling frequency of 170 kHz, which represents a minimum sampling rate of 1/170 kHz=5.88 µs.

Oversampling is generally used to reduce the noise component in the measurements: assuming oversampling of 100%, this means that an ADC with a conversion time of less than 5.88 µs/sampling must be used. This limit means that the DSP must complete an evaluation loop in a time which is less than twice the maximum determined, comprising all the control loops which are present.

The result of dividing this value by the number of control loops is: 11.76 µs/6=1.96 µs which represents the maximum time required to complete the processing of each individual control loop.

In the worst case, the PFC block 10 associated with the microprocessor 7 operates at a switching frequency which is approximately twice that of the lamp 2 supply.

In order to maintain good performance, it was considered appropriate to select a DSP microprocessor with an ADC converter which is already internally capable of carrying out conversion at a rate of at least 750 ns. If a 75 MIPS component (i.e. 1/75,000,000=13 ns/instruction, assuming strictly RISC architecture of the component) is used, it is possible to derive the maximum number of instructions which the DSP can carry out for each control loop, the following conditions being established:

1) overall maximum switching frequency=170 kHz
2) resultant switching period=5.88 µs
3) execution time for each individual loop=1 µs×6=6 µs
4) maximum number of instructions for each loop=1 µs/13 ns=76

Since all the control loops require this performance, it is possible to state that a good solution may be achieved by implementing this controller totally integrally within a DSP microprocessor with computing power of at least 75 MIPS and an ADC with at least eight channels and a sampling frequency of at least 750 ns/conversion.

Figure 3:
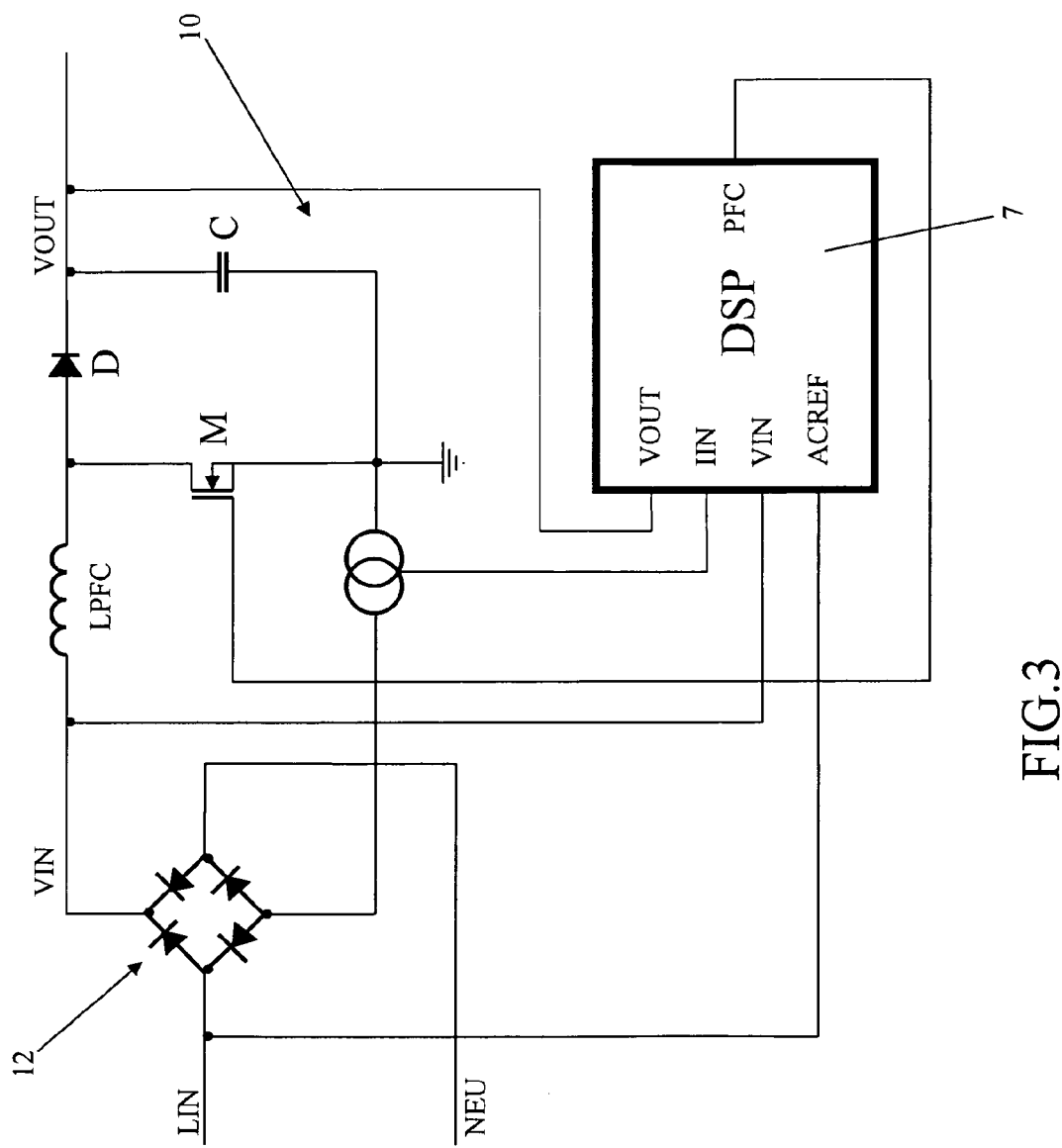
FIG. 3 shows a schematic view of a detail of the device of FIG. 2.

The DSP microprocessor 7 controls and regulates the power taken from the public distribution network working in close cooperation with the block 10 and according to a PFC (Power Factor Correction) mode which is made possible by the presence within the block 10 of a bridge circuit 12, an LPFC coil inductor, a semiconductor power device, for example a MOSFET power transistor M and a diode D, connected as shown in FIG. 3.

The DSP microprocessor 7 carries out the function of regulating the current drawn from the network in such a manner that the current follows a sinusoidal course in phase with the waveform of the network voltage and this is the PFC (Power Factor Correction) function performed by the block 10.

In conventional systems, i.e. based on controllers specifically intended for this function, the course of the current faithfully "follows" that of the voltage, since there is none other available for this function. In the DSP device 7, the reference waveform is not obtained from the input network voltage, but is made up of a perfect (tabulated) sinusoid which is adjusted in amplitude to the network voltage which is measured from time to time.

With the aim of achieving regulation which completely complies with regulatory requirements, for example standard EN61000-3-2 relating to reflected network harmonics, using a sinusoidal reference instead of the network voltage waveform makes it possible to minimise overall harmonic distortion because the intrinsically generated distortion is not added together with that derived from the input: in other words, the network voltage is never a perfect sinusoid but, on the contrary, often deliberately permits considerable distortion due to the installation and/or its instantaneous characteristics. Input distortion is thus measured which a converter can only make worse by adding its own contribution. Apart from the fact that each PFC block 10 will be designed to minimise introduced distortion, using a pure sinusoidal reference allows a better final practical result.

Another highly important feature performed in block 10 in PFC mode is that of achieving loop gain which is as large as possible in order to introduce the least possible error in tracking the reference waveform, by limiting this value to a maximum permitted by the control theory combined with the sampling theorem: in conventional controllers, this entails a fixed maximum loop gain.

In the DSP device 7, loop gain may vary as a function of the phase angle of the reference sinusoid relative to its starting point. On the basis of what usually happens in conventional controllers, the maximum possible value for loop gain is established by stability constraints which are valid along the entire reference sinusoid. In practice, if only the portion of the sinusoid ranging from 0 to 90° is to analysed, it may be noted that loop gain should be as large as possible in absolute terms in the first part of the sinusoid, where its gradient is steepest. However, it may be noted that in the central part of the sinusoid, gain could also be reduced, since the input itself allows subsequent variations which are ever more restricted until the peak is reached (angle of 90°). During this second part, using the DSP device 7 makes it possible to modify loop gain by virtue of the instantaneous angle described by the sinusoid, in such a manner as to achieve results which are not possible using a conventional approach.

All this amounts in practice to having a control loop which is not unique, but changes by virtue of the sinusoid angle, in effect corresponding to the presence of two or more simultaneous control loops and with the possibility of switching them on-line without in any way impairing general functionality, but on the contrary enhancing its characteristics. This has only been made possible by the digital approach which it has been decided to adopt for regulating lamp supply, something which is utterly impossible by means of a conventional approach.

The DSP microprocessor 7 having been adopted, it is possible to carry out "on-line" modification of the operating conditions of the device 1 in relation to the status of some variables.

More particularly, given that the MOSFET M of block 10 is switched in "hard switching" mode, the switching energy dissipated by the power MOSFET M is proportional to the square of the voltage prevailing on each switching cycle across the parasite output capacitor of said MOSFET.

The voltage present across the MOSFET M just before it switches closed is virtually that available on the bank capacitor C. If switching losses are to be minimised, this voltage must be minimal; however, on the other hand, it must always be greater than the peak input network voltage, plus an appropriate margin to allow the LPFC coil of the PFC to operate under "continuously flowing current" conditions.

Both requirements have simultaneously been met according to the present invention by requiring that the output voltage Vout or bank voltage not be fixed at an appropriate value, but may from time to time be positioned at a value which is dependent on the input voltage.

Purely by way of example: if the input network has an RMS value of 230 V AC, its peak will be 230×1.4142=325 V.

On the basis of the LPFC coil value, if good functioning is to be obtained from it, it is observed that the output voltage (bank voltage) must be at least 40 V greater than the input peak.

If it is assumed that the bank voltage must be at least 365 V, by adjusting the switching losses to be proportional to the factor 365×365=133225, a first proportionality factor will be obtained.

If, on the other hand, it is assumed, at another moment in time, that the measured network voltage is equal to 210 V, it will be possible for the bank voltage to be fixed at 210 V×1.4142+40 V=337 V. It follows that switching losses must be proportional to the factor 337×337=113659.

The two different proportionality factors make it appropriate to establish a bank voltage reference which is dependent on the peak input voltage, such that losses are always and in any event minimal, so satisfying the objective of maximising conversion efficiency.

The different bank voltage does not become a problem for the subsequent lamp supply stage, because within this process there is a lamp current controller which will thus not be dependent on the bank voltage.

It is worthwhile noting that the fact that the lamp supply is current regulated makes it possible greatly to reduce the loop gain on the bank voltage, in order to minimise harmonic input components due to sampling of the output ripple.

In other words, the PFC voltage controller stage 10 is dimensioned such that its gain is less than that calculated on the basis of the parameters in play, with the aim of minimising the amplitude of the second harmonic component returned in input (this being in consideration of the fact that, according to the sampling theorem, this second component will bring about a third harmonic component). This solution makes the output voltage less precise, so allowing greater ripple, but makes it possible to improve the overall dynamic behaviour of the stage.

The possibility of evaluating the harmonic components of network current and voltage was included within the regulation process for the current drawn by the PFC block 10, such that it is possible to calculate apparent and active power, the ratio of which is the power factor. For reasons of code size and due to the fact that harmonic components beyond the 9th are insignificant, it was decided to stop harmonic analysis at the 9th component.

Apparent power will thus be determined from the ratio between the product of the input voltage and current calculated as the sum of harmonic components and the product of voltage and current relating solely to the fundamental: the ratio calculated in this manner represents the power factor and will be available for each network period. This method of calculating both apparent and active input power is mathematically scrupulous and exact and thus also makes it possible to calculate a record of the power passing through the electronic ballast 1, such that the latter is capable of "counting" consumption data over time, a function which it is difficult to achieve conventionally without adding components which are specifically dedicated to this function.

b) Control and Regulation of Current in the Lamp.

Discharge lamps have conventionally been supplied by an alternating current which is derived from the network voltage, thus with a low operating frequency, by means of current limitation achieved with an external coil in series (reactor) which also has the purpose of stabilising current within certain limits.

In this manner, the equivalent electrical model of the lamp is particularly complex to describe, involving a strongly capacitive nature and a "diode effect" which tends to increase as the lamp ages. At the end of its life, a lamp supplied in this manner actually becomes an equivalent diode which thus constitutes a short circuit when directly polarised.

Furthermore, given the electrical structure of such a circuit, it is difficult to maintain stabilisation of the current in the lamp if the network experiences significant voltage variation. This is also due to the fact that lamp manufacturers restrict the operating range of their own lamps to within a few percentage points of variation in network voltage.

Unlike the conventional approach proposed by the prior art, in the electronic ballast 1 of the present invention the current delivered to the lamp is at high frequency, nominally between 20 and 75 kHz.

In this manner, the electrical model of the lamp changes substantially, in effect becoming a pure resistor and completely losing all the capacitor and "diode effect" characteristics present in the low frequency model. With such a purely "resistive" model, current control is very much simpler and further possibilities arise:

regulating current to truly very low levels;
the lumen/W ratio becomes more advantageous;
the end of lamp life is determined only by an excessive reduction in its equivalent impedance.

Using this mode of driving current in the lamp, the voltage across the lamp becomes a completely non-essential variable and may indeed simply be ignored. Knowledge of the voltage across the lamp is thus an item of information which is only of use for automatic identification of the power of the connected lamp, but no use it made of it for the purpose of driving or control.

Current limitation exhibits a range which may fall below 10% of its nominal value, a situation which is very different and involves very much larger margins for manoeuvre than occur conventionally.

It should, however, be pointed out that at frequencies higher than approx. 2 kHz, a phenomenon known as "acoustic resonance" occurs and that this is known to be a limiting factor for high frequency operation of this type of equipment.

Acoustic resonance, if it is not controlled and appropriately eliminated, is a very dangerous phenomenon which may involve various negative consequences such as:

unexpected switch-off of the lamp due to interruption of current flow;

explosion of the bulb due to excessive dissipation of mechanical energy.

In HPS lamps the phenomenon of acoustic resonance is limited to a few frequencies (in a narrow band) and is thus easy to eliminate, whereas it is almost always present over the entire spectrum of interest for the ballast for MHID metal iodide lamps.

The prior art has already proposed some methods for detecting acoustic resonance and for containing its effects; all these methods are based on controlling lamp current.

While advantageous in some respects, these methods are not applicable to the electronic ballast 1 of the present invention.

However, starting from the recognition that acoustic resonance only occurs at specific frequencies, which are not usually known a priori, it would be appropriate to be able to suppress such frequencies from the spectrum of those which can be generated once they had been accurately recognised and identified.

This method could also be applicable for HPS lamps, but such an approach is, in contrast, not usable for driving MHID metal iodide lamps.

Advantageously, according to the invention, it was decided to adopt a completely different approach and to change the driving frequency continuously throughout the lamp switch-on period such that the stress is not constantly within a critical frequency, but distributes the energy over a wider band, in which the phase of the various components produced in this manner is such as to completely cancel out the phenomenon of acoustic resonance.

This approach might appear disconcerting to a person skilled in the art since a modulation in frequency (which would be the substantial result of the approach embodied by the invention) also in response brings about a modulation in amplitude of lamp current, with a consequent variation in luminosity.

Still according to the invention, it was decided to introduce a modulation in frequency within the central frequency which is determined by the light level which it is desired to obtain from the lamp.

Essentially, the modulation in frequency effected by the electronic ballast 1 is strictly within bands are completely outside those which the human eye is capable of perceiving as flickering.

On the basis of studies carried out by the Applicant, two fundamental modulation values have been determined:
  maximum deviation in frequency is kept to 1 kHz;
  depth of modulation is limited to 10%.

In order to offset the effect of amplitude modulation, by exploiting the thermal constant of the lamp which is of the order of minutes, it was necessary to introduce a further modulation of a very much lower frequency than the preceding one (of the order of a few Hz) with a value of 1% of the nominal value of lamp current.

In other words, a 1% modulation of the nominal level of lamp current at a frequency of a few Hz was introduced.

The first modulation is purely sinusoidal, the second is square wave. However, due to the effect of closed-loop control of lamp current, this second modulation will have a limited exponential effect, and this in any event allows the human eye to perceive the light to be absolutely constant and uniform.

The modulations described in this manner are applied to all frequencies in the control band, nominally between 20 and 75 kHz.

In HPS lamps, while such modulations are not strictly necessary, their effect is clearly visible in the uniformity of luminous flux from the bulb, as may be revealed by observation with a non-actinic screen.

c) Starting and Restarting the Lamp

Discharge lamps generate light by a thermoelectric effect, i.e. by heating a gas within a bulb filled with a gaseous substance which determines the characteristics of the light emitted. However, gas is an insulating material and current cannot flow through it unless it is in a state of preionisation, a condition which is achieved by means of a high voltage electric discharge. The starting embodied in the electronic ballast 1 of the present invention, in contrast, provides always keeping the current passing through the lamp under control in order also to optimise the true starting phase itself, in such a manner as to generate high voltage pulses only when they are actually necessary.

Figure 4:
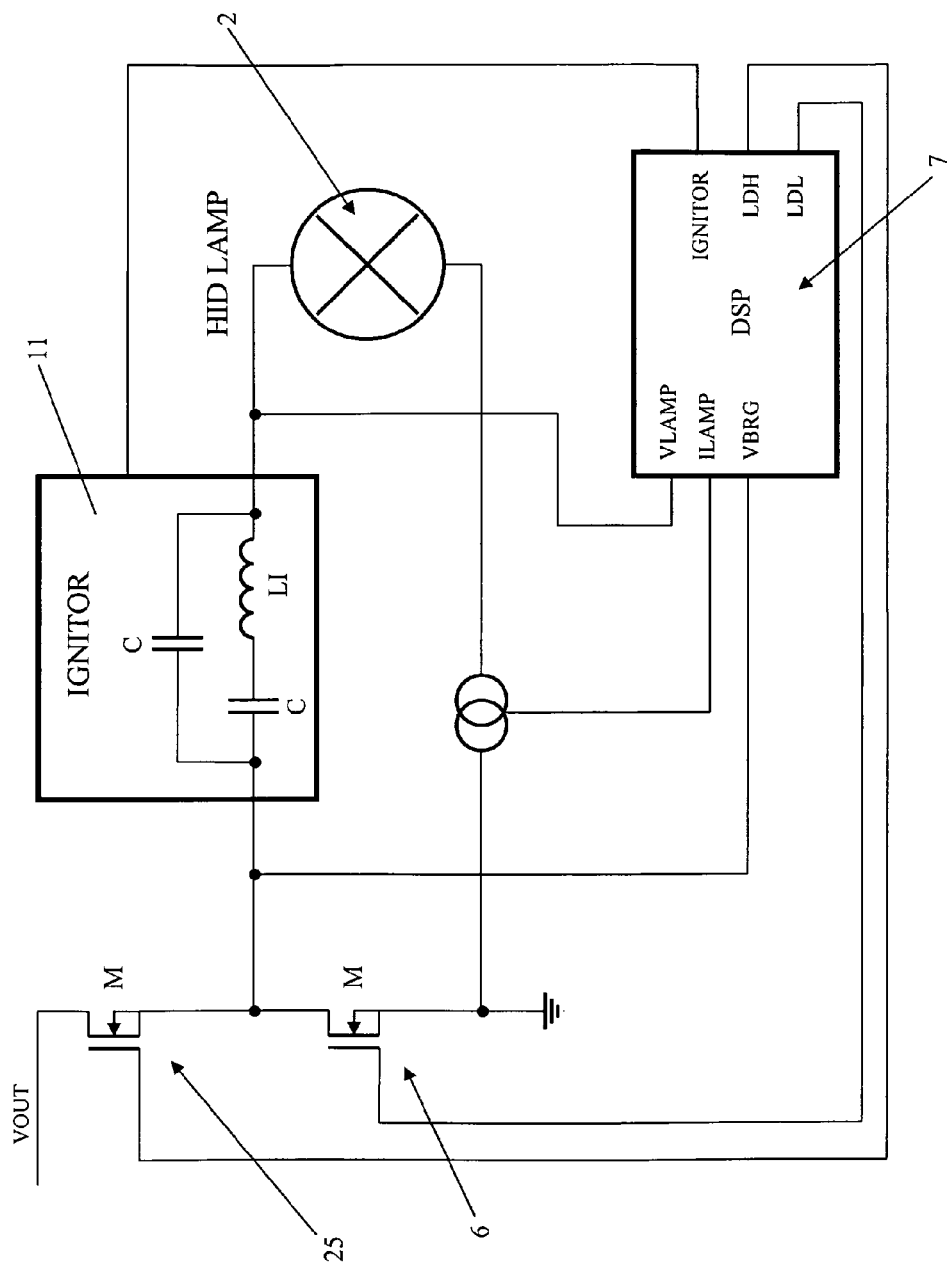
FIG. 4 shows a schematic view of an output stage of the device According to the invention and of its connections with an HPS lamp.
Figure 5:
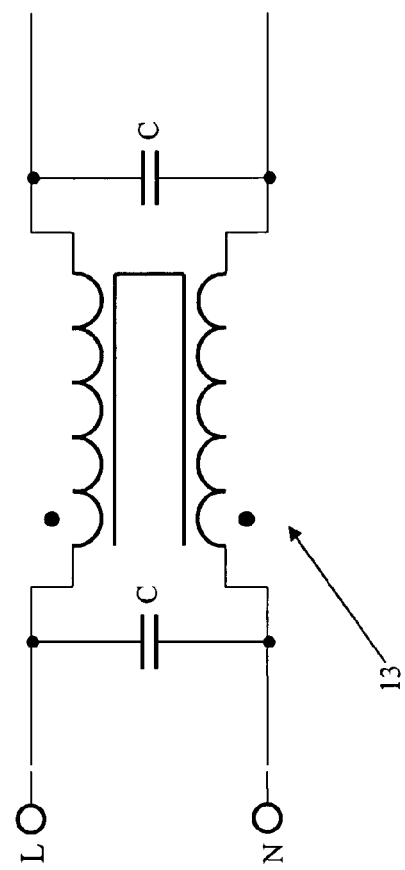
FIG. 5 shows a schematic view of a detail of a line filter incorporated in the device according to the invention.
Figure 6:
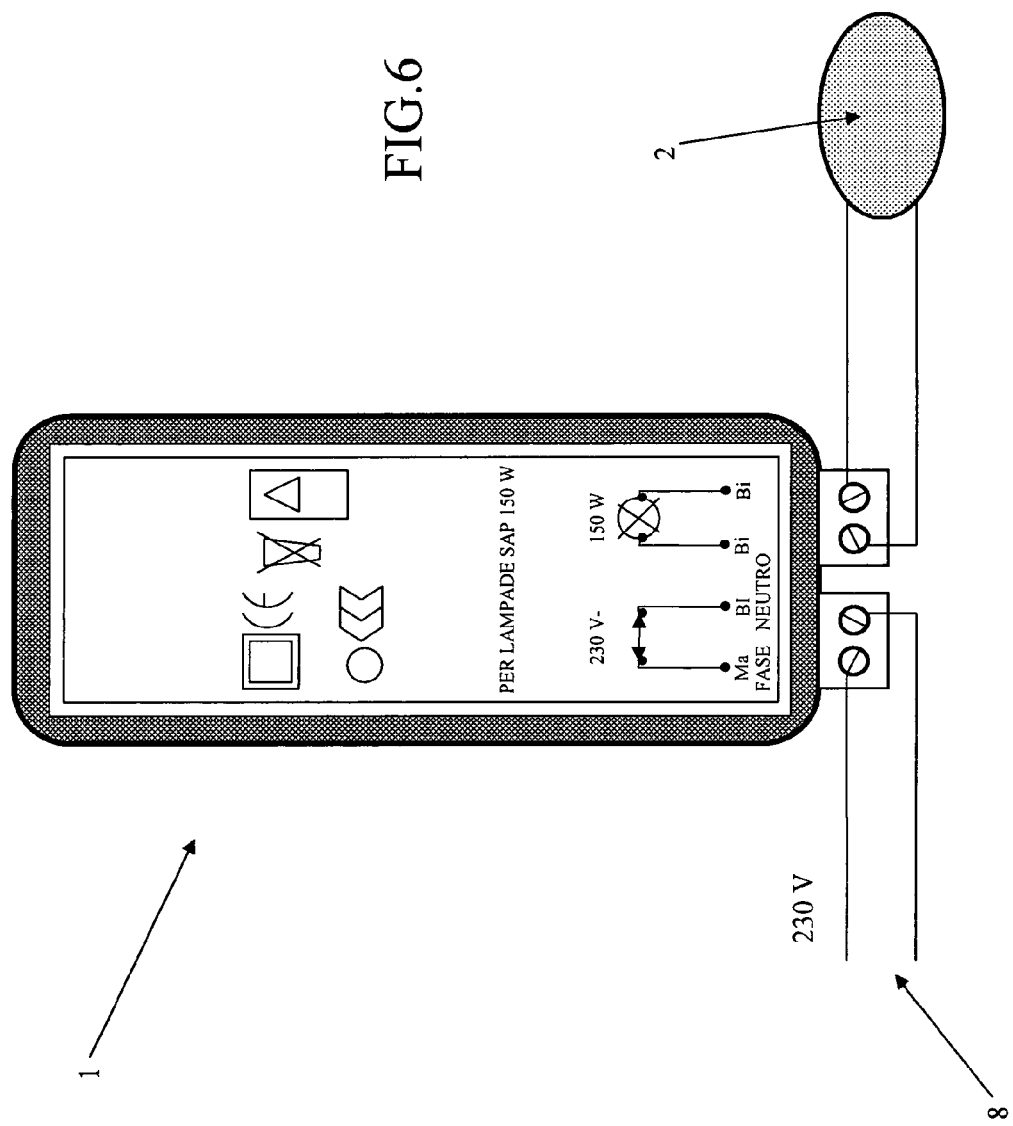
FIG. 6 shows a perspective view of a prototype of the device of FIG. 2.
Figure 7:
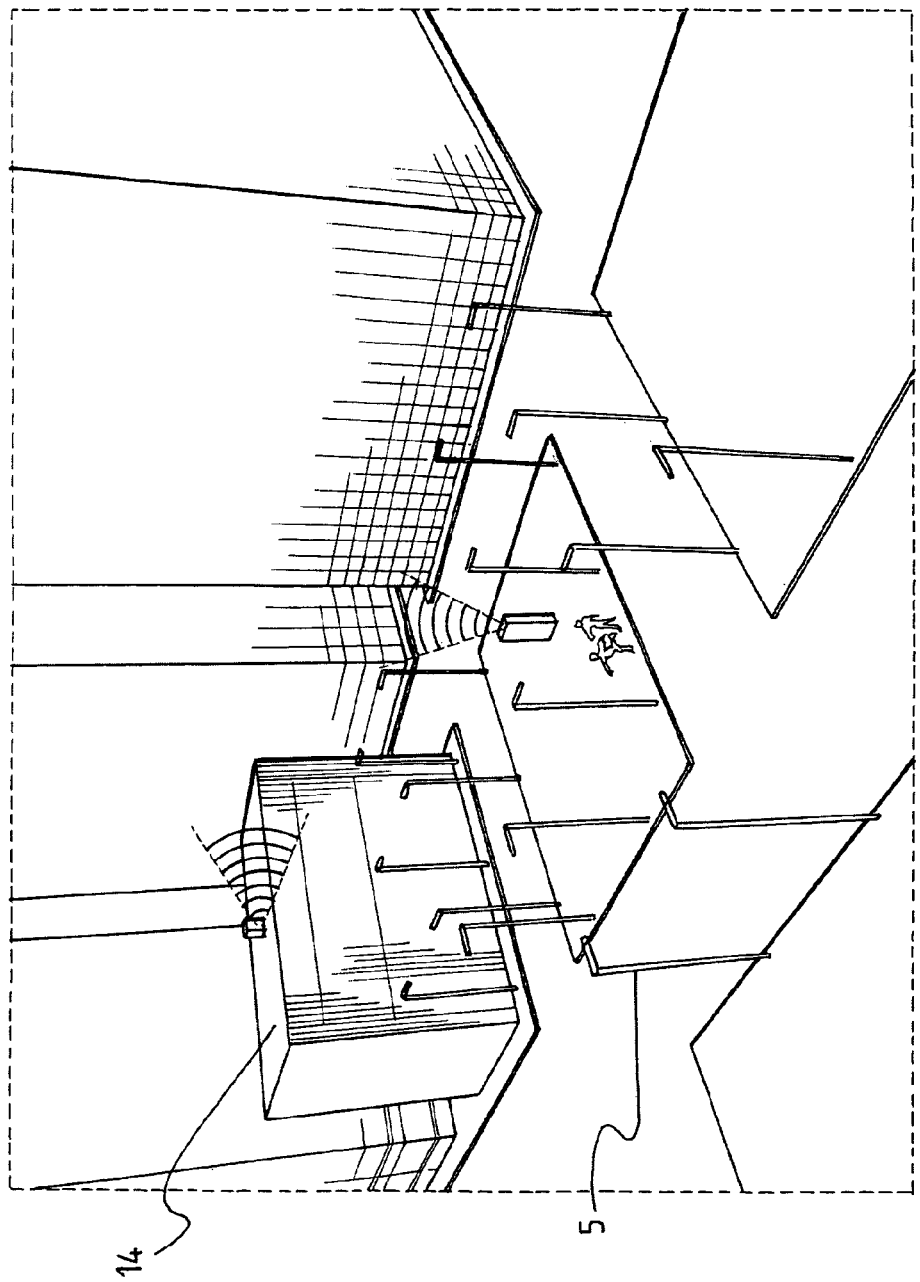
FIG. 7 shows a schematic view of a public lighting installation in which the luminaires or lamp posts are each equipped with the device of FIG. 2.

The method for driving is a closed-loop method, with continuous measurement of the current flowing in the lamp. FIG. 4 shows the relevant connections between the processor 7 and the injection block 11. When the current value is above a predetermined threshold, the lamp is deemed to have been started and the current passing through it is maintained by the above-stated methods.

When an HPS lamp is switched off for whatever reason, the electronic ballast 1 is capable of switching it back on immediately (hot strike restart) at the same level of luminosity as was previously delivered.

This possibility can only be achieved for HPS lamps because for MHID metal iodide lamps the restarting voltage is strongly dependent on the temperature of the electrodes and in general of the bulb.

If an MHID lamp is to be restarted hot, a starting voltage of above 30 kV, i.e. 10 times greater than that applied to the lamp under normal cold start conditions, something which is obviously impossible to achieve at reasonable cost.

A distinction must thus be drawn between the restarting behaviour of HPS lamps and that of MHID lamps.

There are Two Possibilities for HPS Lamps:
  switch-off at an emission of greater than 80% of nominal value;
  switch-off at an emission of less than said limit.

In the first case, the lamp is lit at an emission level of >=80% of its nominal light emission value, is switched off and switched back on while hot.

If this result is to be achieved, it is necessary to estimate the drop in bulb temperature as a result of the time which elapses between the time at which it is switched off and when it is subsequently switched back on. If the time interval is less than an empirically established, predetermined value, switching on again must be performed with a sustained and compatible initial current, namely a current of the same order of magnitude as that drawn before switch-off, for example 80% of 150 watts, which means that 120 watts must be supplied for switching back on at this latter value. Otherwise, the lamp could behave unexpectedly and continually go out unintentionally due to a phenomenon similar to acoustic resonance, but which would occur at very low frequencies and with time constants of a few seconds.

If, on the other hand, a sufficiently long period of time (which allows substantial cooling of the bulb) had elapsed, restarting may be achieved at a low current level, as in the case of switching on a lamp which is off.

In the second case, however, the sequence of events is as follows: lamp lit at an emission level of <80%; lamp switch-off and switching back on when hot.

Switching back on may be the same as the procedure followed for cold switch-on, because the phenomenon previously described with reference to the first case cannot occur. Once switched on again, the lamp maintains its status.

As stated, MHID metal iodide lamps cannot be switched back on when hot due to the excessive voltage required to restart the gas. In order to determine the time at which the lamp will again be startable, the drop in temperature of the bulb must be estimated.

It has been found experimentally that a time interval of at least three minutes is sufficient to return the lamp to the minimum conditions for attempting a restart. The electronic ballast 1 calculates said time interval by detecting its own behaviour following a configuration carried out during installation.

Lamp starting is a procedure which can fail for an indeterminate reason, either because the lamp might not be physically connected to the output terminals, or because the lamp has reached the end of its life and its operation cannot be extended. Generating a high voltage pulse effective for starting is in any event an operation which may apply excessive stress on the electronic components of the ballast 1, especially under conditions of elevated ambient humidity.

In the case of a missing or worn out lamp, repeated generation of pointless starting cycles may be a risk factor for the average service life of the ballast. In order to reduce this risk, the starting procedure is substantially modified once a maximum limit of attempts without any outcome has been reached. However, in order to return to normal operating conditions, it is sufficient for the lamp to be startable in accordance with the standard procedure: this usually happens when a worn out lamp is replaced with a new one.

d) Electrical Measurements and Storage.

In comparison with conventional driving devices, which do not carry out any measurements, the electronic ballast 1 is capable of recording electrical measurements in an internal archive, for example an EEPROM built into the processor 7, which may subsequently be downloaded by the remote connection via the modem 15 for optional subsequent or remote processing of the stored data by the remote unit 14.

Unlike the recording of consumed power, all the measured electrical parameters are "photographed" at specific, regular successive points in time. Apart from the measured electrical variables, two counters relating to lamp operation are also recorded: the first counts the number of seconds of light delivery by the lamp irrespective of the emitted light level; the other records the energy which passes through the lamp, calculating a true integral of current over time.

The two counters are remotely available to permit evaluation of the actual lamp "fatigue" or its true age in order to plan for its scheduled replacement.

e) Management of Light Profiles

The energy saving achievable by using the electronic ballast 1 may be further increased by the available light profile functionality. In particular, 53 light profiles are available which allow programmed operation over a period of an entire year with a granularity of one week. Within a given profile, a twenty four hour period can be subdivided at will into a maximum of eight different sections with a minimum granularity of seven minutes and thirty seconds: the firmware of the ballast 1 is capable of cyclically verifying the light level which must be delivered as a function of the corresponding time.

The structure and functioning of the modem 15 built into the board of the electronic ballast 1 and which allows connection of any device to a concentrator with Power Line Communication functionality will now be looked at in greater detail.

The data processing architecture is based on the fact that the modem 15 can be unambiguously addressed through an MAC (Media Access Control) address and the underlying network is a VPN (Virtual Private Network) network in which each node can be registered and authenticated.

For the purposes of the present invention, each electronic ballast 1 associated with a luminaire should be deemed to be a registered and authenticated node.

The remote management unit 14 or concentrator is equipped with multiple connection layers, particularly relevant layers being the UMTS or GPRS wireless protocol, which makes it possible for the concentrator itself to become an IP node, for example with an address which is static or determined by a DHCP protocol, and so to be accessible irrespective of the geographic zone in which it is located.

Each individual section of the communication line is managed through the PLC device 16 for routing commands and data to and from the peripheral units. The network constructed in this manner enables remote control of the functioning of each individual electronic ballast 1.

Communication between the concentrator and each electronic ballast 1 proceeds by means of a series of commands, the operating function of which is stated briefly purely by way of indicative, non-limiting example.

RESET_UNIT remote reset of apparatus
GET_FULL_STATUS read internal status of ballast
GET_STATUS read lamp status
GET_LIGHT_LEVEL read current light level
GET_MEASUREMENT read one or more measurements
GET_LAMP_LIFE read lamp life and energy counter
GET_PROFILE read profile
GET_DATA_LOGGED_FILE download measurement archive
GET_CONFIGURATION read configuration
GET_TIME read internal timer
GET_ACTIVE_PROFILE read current light profile
GET_FW_CODE download firmware
SET_LAMP_ON switch-on
SET_LAMP_OFF switch-off
SET_LIGHT_LEVEL program light level
SET_CLEAR_LIFE_COUNTER set life and energy totaliser counters to zero
SET_PROFILE store light profile
SET_TIME program schedule
SET_CONFIGURATION configuration
SET_EXEC_PROFILE execute light profile
SET_FW_CODE load firmware The electronic ballast 1 of the present invention enables remote management of both the functioning of the ballast itself and the local area surrounding the luminaire in which it is installed.

The electronic ballast 1 comprises an expansion port which allows connection with external devices such as a SensorBox which is a structure capable of accommodating various types of sensors, for example:

1. pollution measurement using several sensors for the various types of response;
2. temperature measurement;
3. humidity measurement;
4. background noise measurement (noise pollution);
5. presence sensor (thermal sensitivity);
6. wi-fi because, there being energy on each luminaire, the ballast 1 is capable of managing this type of apparatus;
7. GPS;
8. webcam with archiving of the photographs taken on flash memory located within the SensorBox;

9. USB port for high speed data exchange;

10. receiving the energy produced by a photovoltaic panel, located on the individual lamp post, converting it in such a manner as to use the power linea for sending it to the concentrator and, from the latter, transferring it to an inverter which will feed it into the network.

The SensorBox, which is structurally equipped with its own computing unit, communicates with the electronic ballast 1 through the expansion port to cooperate with the data processing infrastructure already available on the circuit board of said ballast 1 and to achieve coverage of the local area surrounding the point of installation of the ballast 1 intended for monitoring various ambient conditions.

The items of information available in the SensorBox are exchanged with the ballast 1 and, via the latter and via the modem connection 15, are delivered to the concentrator which will store and process the information received for signalling immediate action reports, typically alarm signals, or for any optionally required subsequent processing such as for example photographs and digital images requested by judicial authorities and which are still resident in the SensorBox and associated events which have occurred beneath this specific luminaire.

The idea of associating a SensorBox with the electronic ballast 1 also provides associating a physical or geographic position of the lamp standard or lamp post with a logical identifier (ID) which unambiguously identifies it in a database held within the remote management unit 14.

The firmware of both of the processors 7 and 16 present on the board of the ballast 1 must be programmed to this end. It will now be stated in greater detail how this may be achieved.

Each microprocessor 7 is manufactured with a globally unique "serial number" (MAC address), in the exactly the same way as occurs for the network cards now used in computers. Said number is directly diffused into the silicon and thus cannot subsequently be changed for any reason. It is thus not possible for two chips with the same MAC address to exist in the world. The interface protocol which has been established is thus capable of reading this code and of absolutely unambiguously identifying the device. Each time that a voltage is applied to a line on which a concentrator is present, the latter scans the entire line to determine the number and nature of the devices 1 capable of communicating with it, associating the various recognised IDs in an internal dynamic table. The table is dynamic to allow for some devices to be able to go off-line or on-line as desired or required. Each time the concentrator has few tasks to perform, the line scan is repeated to update the table. This operation has a duration which depends on the number of connected devices and on the workload which the concentrator has to handle at the particular moment in time (throughput): it may be completed in a few milliseconds or several minutes. Should a concentrator not be able to recognise all the devices present on a line for reasons of noise, distance or anything else, it is possible also to request this functionality from each device present in the installation. Each of these will thus be capable of maintaining its own internal dynamic table of "contacts" with which bidirectional communication is possible. Complete coverage of the installation may be established by the simultaneous presence of the same contact in at least two different devices present on said line: in this manner, the length or extent of the installation may be unlimited while maintaining full coverage of the devices.

The geographic/logical association of a luminaire cannot automatically be determined merely by this arrangement because it is in any event necessary to create an association between each specific and fixed luminaire and a specific ID of the device 1 which is installed on said luminaire. This involves the following steps:

storing the association between the position of the ballast 1 in the given installation and the ID of the ballast itself. Guided-wave communication on the power line may conveniently be used for this purpose to acquire the ID without error from the ballast itself;

to transfer the geographic information (e.g. a string of 32 characters) into the EEPROM of the DSP microprocessor 7;

to permit off-line downloading of the installed associations into a database which the concentrator will access to identify the exact position of the luminaire in the area;

to permit remote reading of the association between a counter and the client then managing these logical/geographic associations by means of the concentrator.

Using this approach, the physical structure of the installation becomes irrelevant because it is possible to reach any individual lamp whatever its position within the installation, since its relative geographic position is recorded.

The following lines summarise the main characteristics and measurements associated with driving a high pressure sodium (HPS) lamp 2 with the ballast device 1 according to the invention.

PFC Input Stage:

Vin (network input voltage)=90-265 V AC, 50/60 Hz;

Vout max (intermediate bank voltage)=405 V DC

Pout (nominal)=150 W

Pout pknr (peak, non-repetitive)=210 W

An overcurrent limit must, however, be provided.

Pout pk (repetitive)=186 W

Switching frequency=170 kHz

This latter value may be increased to 210 kHz to achieve a further reduction in size of the magnetic components; however, an increase in switching frequency may bring about greater electrical and electromagnetic noise problems.

Efficiency=93.4%

Efficiency may be further increased by introducing other components (including a magnetic component): simulation results would indicate a possible increase of 1%, but this solution is associated with higher costs.

Current loop crossover frequency=27 kHz

The critical frequency of the current loop should be as high as possible to reduce the size, volume and weight of the magnetic components and to reduce high frequency current ripple and ultimately electrical noise; there is, however, an upper limit to this value determined by the switching frequency; as is explained above, the higher is the critical frequency, the greater are the demands placed on the DSP.

Voltage loop crossover frequency=36 Hz

The critical frequency of the voltage loop cannot be too high if the overall harmonic distortion component is not to be degraded. an excessive increase in this value may be associated with problems in terms of overall device efficiency.

Lamp Driving Stage:

Vinmin (minimum bank voltage)=360 V DC

Disregarding the regulatory provisions relating to the consumption of electric power from distribution networks, this stage could also be functional without the PFC, but the best results are achieved with the stated values.

Efficiency=93.4%

This value was measured with the lamp activated under nominal conditions: it drops by approx. 1.8% at the minimum limit of input voltage. Simulation results would suggest trying a lower switching frequency to achieve better results.

Minimum switching frequency=20 kHz
Maximum switching frequency=75 kHz
Equivalent series load=45-57Ω
Maximum starting voltage=4.6 kV
Starting frequency=25-75 kHz HPS lamps cannot normally be started at supply voltages of less than 90-92% of the nominal value: however, this becomes possible thanks to the particular driving mode embodied.

The major advantage of the driving method and device according to the invention is primarily associated with the possibility of achieving substantial savings in the electric power consumption of public lighting installations.

Furthermore, the electronic ballast according to the invention may be installed in existing luminaires or lamp posts, so enabling intelligent management of said luminaire or converting it into a local observation post.

The steps for mass production of the device according to the invention entail performance of an analysis of the tolerances to be adopted with regard to device cost and desired performance.

Some of the factors which have been taken into consideration for this purpose are shown below.

At full load and minimum supply voltage, namely under the theoretically worst possible operating conditions, the PFC stage cannot permit efficiency values of above 95%.

Still at full load, the lamp supply stage cannot permit efficiency values of above 96%.

Consequently, the device 1 according to the invention will permit electrical efficiency at full load of 0.95×0.96=0.912.

In view of the fact that the efficiency of an existing installation is between 0.73 and 0.79, the method and device according to the invention provide an increase in efficiency which ranges from a minimum of 0.91−0.79=0.12 to a maximum of 0.91−0.73=0.18.

This result could be combined with that achievable by reducing luminous flux at particularly convenient times, such as overnight.

This is because, while variations in functioning are virtually impossible with existing installations, reducing lamp current by approx. 50% results in an approx. 30% reduction in luminous flux, which means that the actual electrical energy saving may be still more substantial than has reasonably been estimated in the past.

In addition to reduced lighting management effort, there is also an additional indirect saving arising from the reduced wear suffered by a lamp driven in this manner, which may thus also have an impact on maintenance costs for the installation.

The invention claimed is:

1. A method for driving a discharge lamp, which includes:
providing a DSP electronic processor connected between an alternating current electric supply network and the lamp; and
supplying at least one starting pulse to the lamp in the switch-on phase and regulating the luminosity of the lamp in the steady state, through said DSP electronic processor, which receives on the input side data regarding the current drawn by the lamp and is connected on the output side to a stage incorporating at least one power switch for high frequency switching of the alternate current supply to the lamp,
wherein said DSP electronic processor effects control and regulation of the power taken from the electrical supply network by regulating the current drawn such that it follows a sinusoidal course in phase with a reference waveform adapted to the network voltage which is measured from time to time and by changing continuously the driving frequency through the lamp switch-on period; and
wherein regulation is effected by a closed loop with a loop gain which varies as a function of the phase angle of said sinusoidal course of the reference waveform and relative to its starting point.

2. A command and control device for a discharge lamp supplied by an alternate current electrical supply network, of the type intended to supply a starting pulse to the lamp in the switch-on phase and to regulate the luminosity of the lamp in the steady state, said device comprising:
a DSP electronic processor receiving on the input side data regarding the current drawn by the lamp and connected on the output side to a stage incorporating at least one power switch for high frequency switching of the alternating current supply to the lamp, wherein said DSP electronic processor effects control and regulation of the power taken from the electrical supply network via a PFC block by regulating the current drawn such that it follows a sinusoidal course in phase with a reference waveform adapted to the network voltage which is measured from time to time and by changing continuously the driving frequency through the lamp switch-on period,
wherein said regulation is effected by a closed loop with a loop gain which varies as a function of the phase angle of said sinusoidal course of the reference waveform and relative to its starting point.

3. A command and control device according to claim 2, wherein the intensity of the current supplied to the lamp is variable over a range of 10%- 100% of the nominal draw value.

4. A command and control device according to claim 2, wherein the command and control deevice device is built into a lamp post of a street or public lighting installation.

5. A command and control device for a discharge lamp supplied by an alternate current electrical supply network, of the type intended to supply a starting pulse to the lamp in the switch-on phase and to regulate the luminosity of the lamp in the steady state, said device comprising:
a DSP electronic processor receiving on the input side data regarding the current drawn by the lamp and connected on the output side to a stage incorporating at least one power switch for high frequency switching of the alternating current supply to the lamp, wherein said DSP electronic processor effects control and regulation of the power taken from the electrical supply network via a PFC block by regulating the current drawn such that it follows a sinusoidal course in phase with a reference waveform adapted to the network voltage which is measured from time to time and by changing continuously the driving frequency through the lamp switch-on period; and
further according to claim 3, comprising a modem including a digital controller for a connection to a remote management unit in cooperation with said processor.

6. A command and control device according to claim 2, wherein the switching frequency is variable in a range between 20 kHz and 75 kHz.

* * * * *